(12) United States Patent
Hong et al.

(10) Patent No.: US 10,882,728 B2
(45) Date of Patent: Jan. 5, 2021

(54) BEVERAGE MAKER

(71) Applicant: LG ELECTRONICS INC., Seoul (KR)

(72) Inventors: Jinpyo Hong, Seoul (KR); Dullae Min, Seoul (KR); Daewoong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 178 days.

(21) Appl. No.: 16/017,914

(22) Filed: Jun. 25, 2018

(65) Prior Publication Data

US 2018/0371385 A1 Dec. 27, 2018

(30) Foreign Application Priority Data

Jun. 26, 2017 (KR) .................. 10-2017-0080651

(51) Int. Cl.
*A47J 31/40* (2006.01)
*B67D 1/08* (2006.01)
*B67D 1/00* (2006.01)
*C12C 13/02* (2006.01)

(52) U.S. Cl.
CPC .......... *B67D 1/0895* (2013.01); *A47J 31/402* (2013.01); *A47J 31/404* (2013.01); *B67D 1/0016* (2013.01); *A47J 31/40* (2013.01); *C12C 13/02* (2013.01)

(58) Field of Classification Search
CPC ........ A47J 31/40; A47J 31/402; A47J 31/404; C12C 13/02; C12C 13/10; B67D 1/0016; B67D 1/0078

USPC ............... 99/276, 277, 278, 289 R
See application file for complete search history.

(56) References Cited

U.S. PATENT DOCUMENTS

| | | | | |
|---|---|---|---|---|
| 5,676,041 A * | 10/1997 | Glucksman | ........... | A47J 31/402 99/286 |
| 6,032,571 A | 3/2000 | Brous et al. | | |
| 6,629,490 B1 * | 10/2003 | Lu | .......... | B01D 1/0017 99/276 |
| 9,228,163 B1 * | 1/2016 | Mitchell | ............ | C12C 13/10 |
| D843,767 S * | 3/2019 | Shin | ............ | B01D 1/0017 D7/313 |
| 10,479,669 B2 * | 11/2019 | Kim | .......... | B67D 1/00 |

(Continued)

FOREIGN PATENT DOCUMENTS

| CN | 203723929 | 7/2014 | |
|---|---|---|---|
| DE | 3333541 A1 * | 4/1985 | ............ C12C 13/10 |
| KR | 10-2016-0124508 | 10/2016 | |

OTHER PUBLICATIONS

Kelly, C. "PicoBrew: A First Look," Nov. 2, 2016. Retrieved from https://www.youtube.com/watch?v=3fk1FRuOES8 Retrieved on Oct. 3, 2018, XP054978749.

(Continued)

*Primary Examiner* — Reginald Alexander
(74) *Attorney, Agent, or Firm* — Ked & Associates LLP

(57) ABSTRACT

A beverage maker includes a fermentation tank having an inner space, a water tank that supplies water to the fermentation tank, and an ingredient supply assembly provided between the fermentation tank and the water tank and configured to accommodate a beverage ingredient. At least a portion of the fermentation tank or at least a portion of the water tank is recessed into the ingredient supply assembly.

19 Claims, 12 Drawing Sheets

(56) References Cited

U.S. PATENT DOCUMENTS

| | | | |
|---|---|---|---|
| 2011/0265658 A1* | 11/2011 | Talon | A47J 31/407 99/289 R |
| 2015/0264955 A1 | 9/2015 | Rivera | |
| 2016/0326471 A1 | 11/2016 | Aown et al. | |
| 2017/0130177 A1 | 5/2017 | Geiger | |

OTHER PUBLICATIONS

European Extended Search Report dated Oct. 10, 2018 issued in EP Application No. 18178279.8.
Korean Office Action dated Jul. 21, 2020 issued in Application No. 10-2017-0080651.

\* cited by examiner

BEVERAGE MAKER

CROSS-REFERENCE TO RELATED APPLICATION(S)

This application claims priority under 35 U.S.C. § 119 to Korean Application No. 10-2017-0080651 filed on Jun. 26, 2017, whose entire disclosure(s) is/are hereby incorporated by reference.

BACKGROUND

Field

The present disclosure relates a beverage maker.

Background

Beverages may be collectively referred to as drinkable liquids such as alcohol or tea, for example. Beverages may be divided into various categories such as water, juice beverages with unique flavor and taste, refreshing beverages, favorite beverages, or alcoholic beverages.

An example of such a beverage may be beer. Beer is an alcoholic beverage that may be produced with malt, which may be made by sprouting barley, filtering a liquid byproduct of the barley, adding hop, and fermenting yeast.

Consumers may purchase ready-made products made and sold by a beer maker or take home beer (or handmade beer) produced by directly fermenting beer ingredients at home or in a bar. Homemade beer may be made in a variety of types rather than ready-made products and may be made to better suit the consumer's taste.

The ingredients used in making beer may include water, liquid malt, hop, yeast, flavoring additive, and the like, for example. Leaven, which may be referred to as yeast, may be added to liquid malt to ferment the liquid malt and assist production of alcohol and carbonic acid.

The flavor additives may enhance the taste of beer, such as fruit, syrup, vanilla beans, and the like, for example. Homemade beer may include three stages, namely, a wort production step, a fermentation step, and an aging step, and it may take about two to three weeks from the wort production step to the aging step. It is important for the homemade beer to remain at an optimum temperature during the fermentation stage, and the simpler the process in making the beer, the more user's convenience is improved.

Recently, consumers have begun using homemade beverage makers capable of easily making a beer-like beverage in a home or a bar, and in order to increase usability, such a beverage maker should be convenient. Accordingly, described herein is a compact beverage maker that may optimize a shape of a supplier provided between a fermentation tank and a water tank.

Further, a beverage maker may be capable of easily locking and unlocking a lid module of a supplier to an ingredient accommodation body between the fermentation tank and the water tank to accommodate a beverage ingredient, wherein at least one accommodation space in which at least a portion of the fermentation tank or at least a portion of the water tank is accommodated is recessed in the supplier to minimize a spaced distance between the fermentation tank and the water tank.

According to an embodiment, each of the fermentation tank and the water tank may have a cylindrical shape, and a first accommodation space, in which a portion of the fermentation tank is accommodated, of the at least one accommodation space may have a curvature equal to or less than that of the fermentation tank, and a second accommodation space in which a portion of the water tank is accommodated may have a curvature equal to or less than that of the water tank. According to an embodiment, the supplier may include a plurality of ingredient accommodation parts in which a plurality of ingredients are divided into each other, and the plurality of ingredient accommodation parts may be arranged in a line in a direction perpendicular to a first direction in which the water tank and the fermentation tank are spaced apart from each other to minimize the spaced distance between the fermentation tank and the water tank.

A supplier provided in a beverage maker may include an ingredient accommodation body in which an ingredient accommodation part is provided, a lid opening/closing the ingredient accommodation part, and a locking module locking the lid to the ingredient accommodation body. The supplier may further include a hinge part comprising a hinge shaft provided on one of the lid and the ingredient accommodation body and a hinge shaft connection part provided on the other one of the lid and the ingredient accommodation body and rotatably supported by the hinge shaft, and a torsion spring pressing upward rotation of the lid when the lid is unlocked. Thus, when the lid is unlocked, the lid may be automatically opened.

The supplier may be provided between the fermentation tank and the water tank to minimize the spaced distance between the fermentation tank and the water tank, thereby realizing the beverage maker having a more compact size and providing positive effects in terms of the overall balance and beauty of the beverage maker. Also, the plurality of ingredient accommodation parts provided in the supplier may be minimized in a spaced distance between the fermentation tank and the water tank, thereby realizing the beverage maker having a compact size.

In addition, the beverage maker may include a locking structure in which the lid may be automatically locked on the ingredient accommodation body when the lid provided in the supplier and covers the ingredient accommodation part, and thus, a separate additional operation for locking the lid by the user may be removed to improve convenience. Also, the hinge structure in which the lid is automatically opened when the lid is unlocked may be provided to remove a separate additional operation for opening the lid by the user, thereby improving convenience.

BRIEF DESCRIPTION OF THE DRAWINGS

The embodiments will be described in detail with reference to the following drawings in which like reference numerals refer to like elements wherein.

DETAILED DESCRIPTION

Figure 1:
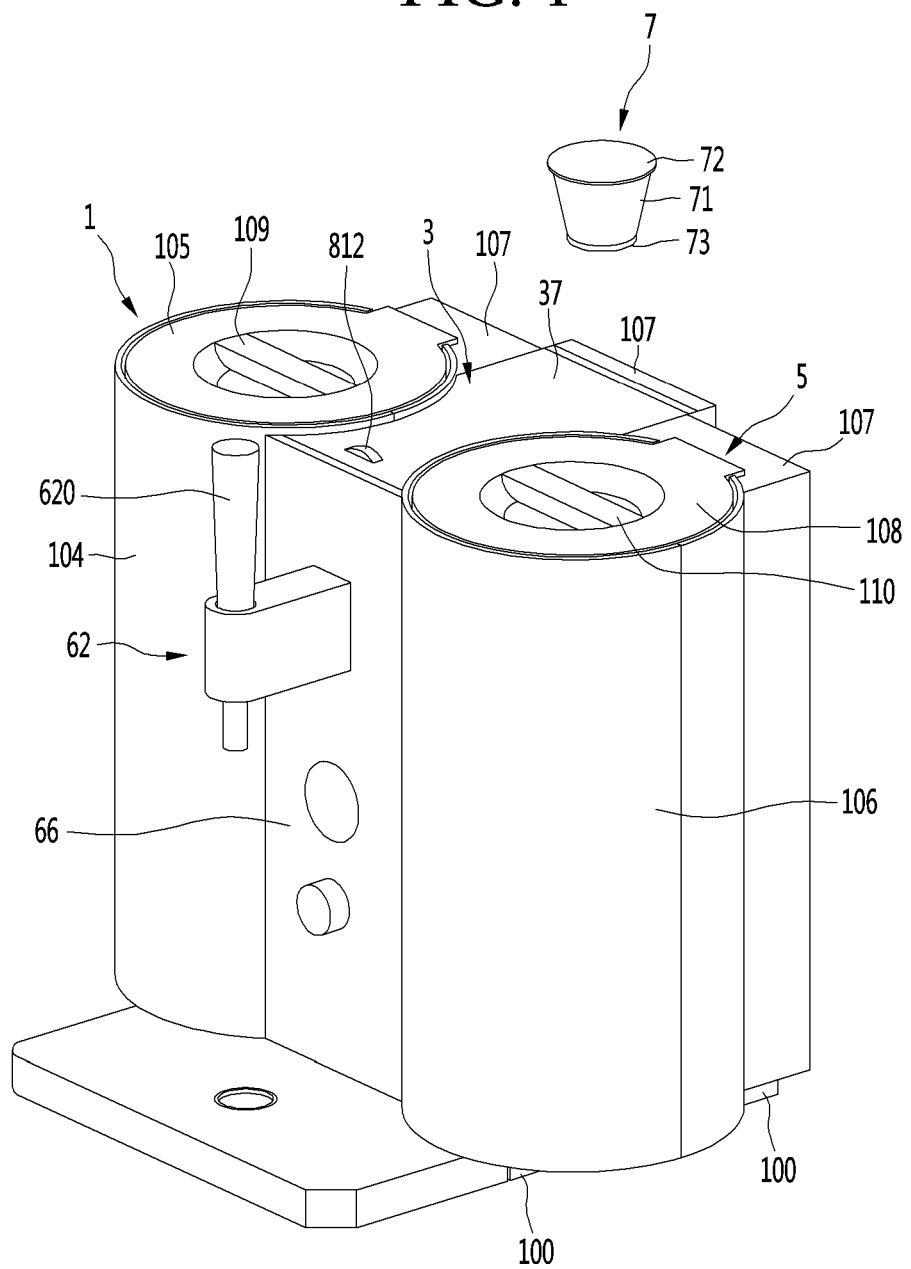
FIG. 1 is a perspective view of a capsule in which a beverage ingredient is contained and a beverage maker having the capsule according to an embodiment of the present disclosure.
Figure 2:
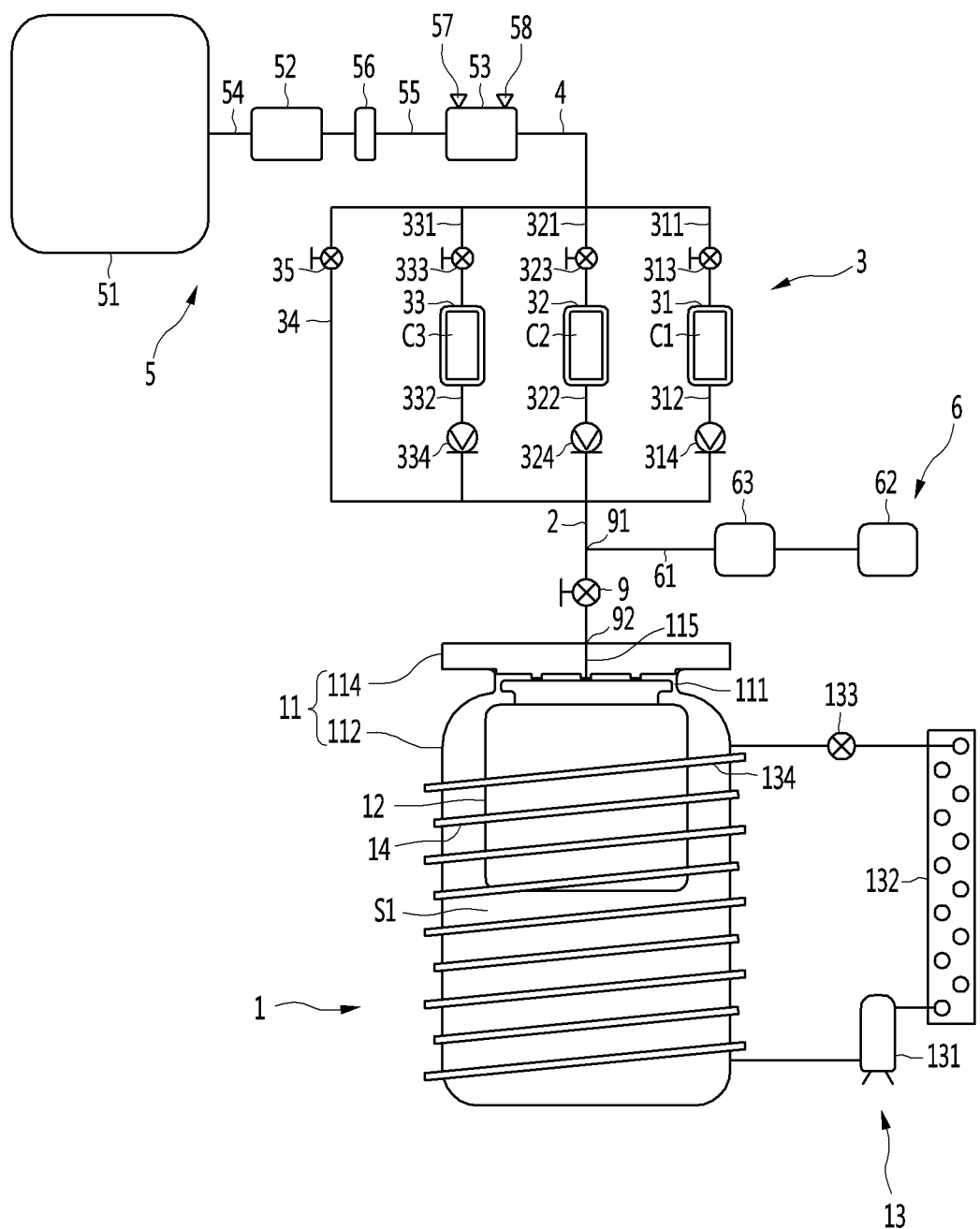
FIG. 2 illustrates an overall configuration of the beverage maker according to an embodiment.

Reference will now be made in detail to the embodiments, examples of which are illustrated in the accompanying drawings. FIG. 1 is a perspective view of a capsule in which a beverage ingredient is contained and a beverage maker having the capsule according to an embodiment, and FIG. 2 illustrates an overall configuration of the beverage maker according to an embodiment. The configuration view and the perspective view of FIGS. 1 to 2 are merely examples for convenience of explanation, and thus, a configuration and outer appearance of the beverage maker including the capsule is not limited thereto. Also, it is assumed that the beverage made by using the beverage maker is beer in this specification, but types of beverages that are capable of being made by using the beverage maker may vary.

As illustrated in FIG. 1, the beverage maker may include a fermentation module 1, a supplier (or ingredient supply assembly) 3 connected to the fermentation module 1 through a main passage 2, a water supply module 5 connected to the supplier 3 through a water supply passage 4, and a beverage dispenser 6 that dispenses a beverage fermented in the fermentation module 1 to an outside of the beverage maker. The fermentation module 1 may include a fermentation tank assembly 11 having an inner space S1.

The fermentation tank assembly 11 may include a fermentation tank 112 in which an opening 111 is defined in an upper portion and the space S1 is defined therein, and a fermentation tank cover 114 that covers the opening 111. The fermentation tank 112 may be provided as an assembly of a plurality of members. The fermentation tank cover 114 may seal the inside of the fermentation tank 112 and may be provided on the fermentation tank 112 to cover the opening 111. The fermentation tank cover 114 may include a main passage connection part or tube 115 connected to the main passage 2.

The fermentation module 1 may further include a beverage making pack 12 configured to be inserted and accommodated into the fermentation tank assembly 11. The beverage making pack 12 may be a pack containing an ingredient used to make a beverage. The beverage making pack 12 may be smaller than the space S1 defined in the fermentation tank assembly 11. The beverage making pack 12 may be inserted and accommodated into the fermentation tank assembly 11 when the ingredient is contained in the beverage making pack 12.

The beverage making pack 12 may be inserted and accommodated into the fermentation tank 112 when the opening of the fermentation tank 112 is opened. The fermentation tank cover 114 may cover the opening 111 of the fermentation tank 112 after the beverage making pack 12 is inserted into the fermentation tank 112. The beverage making pack 12 may assist fermentation of the ingredient when the beverage making pack 12 is accommodated in the space S1 that is sealed by the fermentation tank 112 and the fermentation tank cover 114. The beverage making pack 12 may expand due to a pressure created therein during the making of the beverage.

According to an embodiment, the beverage made by the beverage maker may be made without performing a fermentation process. For example, a specific beverage may be made by putting water and an ingredient into the beverage making pack 12 and mixing the water and the ingredient. In this case, the fermentation tank 112 may function as a storage container for accommodating and storing the beverage making pack 12 containing the made beverage.

An example of the beverage that is capable of being made by the beverage maker may be beer. The ingredients used in making beer may include water, malt, yeast, hop, flavoring additive, and the like, for example. The beverage maker may include both the supplier 3 and the beverage making pack 12. The ingredients used in making the beverage may be divided into the supplier 3 and the beverage making pack 12.

At least one of the ingredients used in making the beverage may be accommodated in the beverage making pack, and the remaining ingredients may be accommodated in the supplier 3. The remaining ingredients accommodated in the supplier 3 may be supplied to the beverage making pack together with water supplied from the water supply module 5 and mixed with the at least one ingredient accommodated in the beverage making pack 12.

A main ingredient that is essential in making the beverage may be accommodated in the beverage making pack 12, and an additive added to the main ingredient may be accommodated in the supplier 3. In this case, the additive accommodated in the supplier 3 may be mixed with the water supplied from the water supply module 5 and supplied to the beverage making pack 12 and to be mixed with the main ingredient accommodated in the beverage making pack 12.

The main ingredient accommodated in the beverage making pack 12 may be provided in an amount greater than the other ingredient. For example, when beer is made, the main ingredient may be malt. Also, the additive accommodated in the supplier 3 may be the other ingredients except for malt, for example, the yeast, the hop, and the flavoring additive.

The beverage maker may not include both the beverage making pack 12 and the supplier 3. That is, only the supplier 3 may be provided without providing the beverage making pack 12, and all the ingredients used in making the beverage may be accommodated in the supplier 3. In this case, all the ingredients accommodated in the supplier 3 may be supplied into the fermentation tank assembly 11 together with the water supplied from the water supply module 5. The main ingredient and the additives may be accommodated together in the supplier 3. The main ingredient and the additives may be accommodated in the supplier 3 and may be supplied into the fermentation tank assembly 11 at the same time or may be successively supplied at a time interval.

Also, the beverage maker may not include a separate beverage making pack 12. Thus, a user may directly put a portion of the ingredients used in making the beverage into the fermentation tank assembly 11, and the remaining ingredients used in making the beverage may be accommodated in the supplier 3. In this case, the user may directly put the main ingredient into the fermentation tank assembly 11, and the additive may be accommodated in the supplier 3. The additive accommodated in the supplier 3 may be mixed with the water supplied from the water supply module 5 and may be supplied to the fermentation tank assembly 11 and then mixed with the main ingredient previously put into the fermentation tank assembly 11.

If the beverage maker includes both the supplier 3 and the beverage making pack 12, the beverage may be more easily made. Hereinafter, a case in which the beverage maker includes both the supplier 3 and the beverage making pack 12 will be described as an example. However, the present disclosure is not limited to the case in which the beverage maker includes both the supplier 3 and the beverage making pack 12.

The ingredient put into the beverage making pack 12 may be fermented as time elapses. The beverage which may be completely made in the beverage making pack 12 may flow to the main passage 2 through the main passage connection tube 115 and then may flow from the main passage 2 to the beverage dispenser 6 to be dispensed from the beverage dispenser 6.

The fermentation module 1 may further include a temperature controller configured to change a temperature of the fermentation tank assembly 11. The temperature controller may heat or cool the fermentation tank assembly 11 to adjust a temperature of the fermentation tank assembly 11 to be at an optimal temperature for fermenting a chosen beverage.

The controller may include a refrigerant cycle device 13 including a compressor 131, a condenser 132, an expansion mechanism 133, and an evaporator 134, and one of the condenser and the evaporator may be provided in the fermentation tank assembly 11. When the condenser 132 contacts the fermentation tank 112, the refrigerant cycle device 13 may heat the fermentation tank 112 to increase a temperature of the fermentation tank 112. In this case, the condenser 132 may come into contact with an outer surface of the fermentation tank 112. The condenser 132 may include a condensation tube wound around the outer surface of the fermentation tank 112.

When the evaporator 134 contacts the fermentation tank 112, the refrigerant cycle device 13 may cool the fermentation tank 112 to lower a temperature of the fermentation tank 112. In this case, the evaporator 134 may come into contact with the outer surface of the fermentation tank 112. The evaporator 134 may include an evaporation tube wound around the outer surface of the fermentation tank 112.

The temperature controller may further include a heater 14 configured to heat the fermentation tank assembly 11. The heater 14 may come into contact with the outer surface of the fermentation tank 112. The heater 14 may be a heat generation heater that generates heat when power is applied. The heater 14 may include a line heater and may be wound around the outer surface of the fermentation tank 112.

The refrigerant cycle device 13 may include a heat pump. The refrigerant cycle device 13 may include a flow switching valve. The flow switching valve may include a four-way valve. The flow switching valve may be connected to each of a suction passage of the compressor 131 and a discharge passage of the compressor 131. Also, the flow switching valve may be connected to the condenser 132 through the condensation connection passage and connected to the evaporator 134 through the evaporator connection passage.

When the fermentation tank 112 is cooled, the flow switching valve may guide a refrigerant compressed in the compressor 131 to the condenser 132 and may guide a refrigerant discharged from the evaporator 134 to the compressor 131. When the fermentation tank 112 is heated, the flow switching valve may guide the refrigerant compressed in the compressor 131 to the evaporator 134 and may guide the refrigerant discharged from the condenser 132 to the compressor 131.

Hereinafter, a supplier 3 will be described as follows. The supplier 3 may be connected to a water supply heater 53 through the water supply passage 4 and may be connected to the fermentation tank assembly 11 through the main passage 2. An ingredient that is necessary for making a beverage may be accommodated in the supplier 3, and the water supplied from the water supply module 5 may pass through the supplier 3. For example, when the beverage made in the beverage maker is beer, the ingredient accommodated in the supplier 3 may be yeast, hop, flavoring additive, and the like, for example.

The ingredient accommodated in the supplier 3 may be directly provided into an ingredient accommodation part provided in the supplier 3. At least one ingredient accommodation part may be provided in the supplier 3. a plurality of ingredient accommodation parts may be provided in the supplier 3. In this case, the plurality of ingredient accommodation parts may be partitioned with respect to each other.

The ingredient accommodated in the supplier 3 may be accommodated in a capsule or a cup, for example. At least one ingredient accommodation part in which the capsule is accommodated may be provided in the supplier 3. When the ingredient is accommodated in the capsule, the supplier 3 may be configured such that the capsule is seated and withdrawn. The supplier 3 may be provided as a capsule kit assembly in which the capsule is separably accommodated. The capsule may represent a capsule containing an ingredient used in making the beverage.

The supplier 3 may be connected to each of the main passage 2 and the water supply passage 4. The water supplied into the water supply passage 4 may be mixed with the ingredient while passing through the ingredient accommodation part or the capsule, and the ingredient accommodated in the ingredient accommodation part or the capsule may flow to the main passage together with the water.

A plurality of additives different from each other may be divided within the supplier 3. The plurality of additives accommodated in the supplier 3 may be the yeast, the hop, and the flavoring additive, which may be divided from each other. When the plurality of ingredient accommodation parts are provided in the supplier 3, each of the ingredient accommodation parts may be connected to the water supply passage 4 through a supplier water supply passage and may be connected to the main passage 2 through a supplier outlet passage.

The ingredient accommodation part of the supplier 3 and the capsule accommodation part of the supplier 3 may be substantially the same. When the capsule is inserted into the supplier 3 when the ingredient is accommodated in the capsule, the capsule may be called an ingredient accommodation part. When the ingredient is directly accommodated in the supplier 3 when the ingredient is not contained in the capsule, the supplier 3 may be called an ingredient accommodation part. Since the ingredient accommodation part and the capsule accommodation part have substantially the same role, the case in which the ingredient accommodation part is provided in the supplier 3 will be described as an example for convenience of description.

The ingredient accommodation part in which the capsule containing the additives are detachably accommodated may be provided in the supplier 3. The supplier 3 may be connected to the water supply passage 4 through the supplier water supply passage and may be connected to the main passage 2 through the supplier outlet passage.

An opening/closing valve configured to open and close the supplier water supply passage may be installed in the supplier water supply passage. A check valve configured to prevent fluid from the main passage from flowing back to the ingredient accommodation part may be installed in the supplier outlet passage.

A plurality of ingredient accommodation parts or pockets 31, 32, and 33 may be provided in the supplier 3, and the plurality of ingredient accommodation pockets may be arranged such that the contents of each of the ingredient accommodation pockets 31, 32, and 33 may be mixed into each other. Each of the plurality of ingredient accommodation pockets may be connected to the supplier water supply passage and the supplier outlet passage.

Hereinafter, a first additive, a second additive, and a third additive may be accommodated in the supplier 3. For example, when beer is made by using the beverage maker, the first additive may be yeast, the second additive may be hop, and the third additive may be a flavoring additive.

The supplier 3 may include a first ingredient accommodation part or pocket 31 in which a first capsule C1 containing the first additive is accommodated, a second ingredient accommodation part or pocket 32 in which a second capsule C2 containing the second additive is accommodated, and a third ingredient accommodation part or pocket 31 in which a third capsule C3 containing the third additive is accommodated. The first ingredient accommodation pocket 31 may be connected to a first supplier water supply passage 311 that guides water or air to the first ingredient accommodation pocket 31 and may be connected to a first supplier outlet passage 312 that guides the water discharged from the first ingredient accommodation part 31, a mixture of the water and the first additive, and the air.

A first opening/closing valve 313 configured to open and close the first supplier water supply passage 311 may be installed in the first supplier water supply passage 311. A first check valve 314 configured to prevent the fluid of the main passage 2 from flowing back to the first ingredient accommodation pocket 31 while a fluid of the first ingredient accommodation pocket 31 flows to the main passage 2 may be installed in the first supplier outlet passage 312. Here, the fluid may be the water discharged from the first ingredient accommodation pocket 31, the mixture of the water and the first additive, and the air.

The second ingredient accommodation pocket 32 may be connected to a second supplier water supply passage 321 that guides the water or the air to the second ingredient accommodation pocket 32 and may be connected to a second supplier outlet passage 322 that guides the water discharged from the second ingredient accommodation pocket 32, the mixture of the water and the second additive, and the air. A second opening/closing valve 323 configured to open and close the second supplier water supply passage 321 may be installed in the second supplier water supply passage 321.

A second check valve 324 configured to prevent the fluid of the main passage 2 from flowing back to the second ingredient accommodation pocket 32 while a fluid of the second ingredient accommodation pocket 32 flows to the main passage 2 may be installed in the second supplier outlet passage 322. Here, the fluid may be the water discharged from the second ingredient accommodation pocket 32, the mixture of the water and the second additive, and the air.

The third ingredient accommodation pocket 33 may be connected to a third supplier water supply passage 331 that guides the water or the air to the third ingredient accommodation pocket 33 and may be connected to a third supplier outlet passage 332 that guides the water discharged from the third ingredient accommodation pocket 33, the mixture of the water and the third additive, and the air. A second opening/closing valve 333 configured to open and close the third supplier water supply passage 331 may be installed in the third supplier water supply passage 331. A third check valve 334 configured to prevent the fluid of the main passage 2 from reversely flowing to the third ingredient accommodation pocket 33 while a fluid of the third ingredient accommodation pocket 33 flows to the main passage 2 may be installed in the third supplier outlet passage 332. Here, the fluid may be the water discharged from the third ingredient accommodation pocket 33, the mixture of the water and the third additive, and the air.

The beverage maker may include a bypass passage 34 that allows the water supplied from the water supply passage 4 to bypass the ingredient accommodation pockets 31, 32, and 33 so as to be supplied to the main passage 2. The bypass passage 34 may be connected to the water supply passage 4 and the main passage 2, and the water or the air may bypass the ingredient accommodation pockets 31, 32, and 33 and thus may be guided by the bypass passage 34 to flow the main passage 2.

The bypass passage 34 may be connected in parallel to a passage of the first ingredient accommodation pocket 31, a passage of the second ingredient accommodation pocket 32, and a passage of the third ingredient accommodation pocket 33. A bypass valve 35 configured to open and close the bypass passage 34 may be installed in the bypass passage 34.

The main passage 2 may be connected to the first supplier outlet passage 312, the second supplier outlet passage 322, the third supplier outlet passage 332, and the bypass passage 34. The main passage 2 may include a common tube connected to the fermentation tank assembly 11 and a combination tube connected to the first supplier outlet passage 312, the second supplier outlet passage 322, the third supplier outlet passage 332, the bypass passage 34, and the common tube.

The main passage 2 may be connected to the fermentation tank assembly 11 and may be connected to the fermentation tank cover 114 of the fermentation tank assembly 11. The main passage 2 may be connected to the main passage connection tube 115 provided in the fermentation tank cover 114.

The water supply passage 4 may be connected to the first supplier water supply passage 311, the second supplier water supply passage 321, the third supplier water supply passage 331, and the bypass passage 34. The water supply passage 4 may include a common tube connected to the water supply module 5 and a plurality of branch tubes connected to the first supplier water supply passage 311, the second supplier water supply passage 321, the third supplier water supply passage 331, and the bypass passage 34.

The water supply module 5 may include a water tank 51 configured to hold water, a water supply pump 52 configured to pump the water within the water tank 51, and a water supply heater 53 configured to heat the water pumped by the water supply pump 52. The water tank 51 may be connected to a first side of a water tank outlet passage 54, and the water supply pump 52 may be connected to a second side of the water tank outlet passage 54.

The water supply pump 52 may be connected to a first side of a water supply pump outlet passage 55, and the water supply heater 53 may be connected to a second side of the water supply pump outlet passage 55. A flowmeter 56 that measures a flow rate of the water supply pump outlet passage 55 may be installed in the water supply pump outlet passage 55.

The water supply heater 53 may be a mold heater and may include a heater case through which the water pumped by the water supply pump 52 passes and a heat generation heater installed in the heater case to heat the water introduced into the heater case. A thermistor 57 that measures a temperature of the water supply heater 53 may be installed in the water supply heater 53. Also, a thermal fuse 58 that interrupts a circuit to cutoff a current applied to the water supply heater 53 when a temperature is high may be installed in the water supply heater 53.

When the water supply pump 52 is driven, the water within the water tank 51 may be guided to the water supply heater 53 through the water tank outlet passage 54, the water supply pump 52, and the water supply pump outlet passage 55, and the guided water may be heated in the water supply heater 53 and then may be guided to the water supply passage 4. The beverage dispenser 6 may be connected to the main passage 2. The beverage dispenser 6 may include a beverage dispensing passage 61 which is connected to the main passage 2 and to which the beverage of the main passage 2 is guided.

The beverage dispenser 6 may further include the dispenser 62 connected to the beverage dispensing passage 61. An anti-foaming path 63 may be provided in the beverage dispensing passage 61, and an amount of foam of the beverage flowing from the main passage 2 to the beverage dispensing passage 61 may be minimized while passing through the anti-foaming path. A mesh filtering the foam may be provided in the anti-foaming path 63.

For example, the dispenser 62 may include a lever 620 configured to be manipulated by the user and a tap valve including a micro switch that detects the user's manipulation, but is not limited thereto. The beverage maker may further include a main valve 9 configured to open and close the main passage 2. The main valve 9 may be installed between a connection part or joint 91 between the main passage 2 and the beverage dispensing passage 61 in the main passage 2 and between a connection part or joint 92 between the main passage 2 and the fermentation tank assembly 11.

The main valve 9 may be opened to open the main passage 2 when hot water is injected into the beverage making pack 12. The main valve 9 may be closed to close the main passage 2 when the fermentation tank assembly 11 is cooled. The main valve 9 may be opened to open the main passage 2 when air is injected into the beverage making pack 12. The main valve 9 may be opened to open the main passage 2 when an additive is supplied into the beverage making pack 12.

The main valve 9 may be closed to seal the inside of the beverage making pack 12 during the fermentation of the ingredient. The main valve 9 may be closed to seal the inside of the beverage making pack 12 when the beverage is aged and stored. The main valve 9 may be opened to open the main passage 2 when the beverage is dispensed by the beverage dispenser 6.

The beverage maker may further include a base 100. The base 100 may be a bottom surface of the beverage maker and may support the fermentation tank assembly 11, the compressor 131, the water supply heater 53, the water supply pump 52, and the water tank 51.

The beverage maker may include an insulation wall that surrounds the fermentation tank 112 and the evaporator 134 together. The insulation wall may be made of foamed polystyrene that is capable of absorbing vibration with high heat insulation performance.

The beverage maker may include an insulation wall cover 104 that surrounds a circumferential surface of the insulation wall and a top surface of the insulation wall. The insulation wall cover 104 may be provided as one cover or as an assembly of a plurality of covers. A lower portion of the insulation wall cover 104 may be mounted on the base 100.

The insulation wall cover 104 may protect the insulation wall and may define a portion of the outer appearance of the beverage maker. The insulation wall cover 104 may surround the entire circumferential surface of the insulation wall or may surround only a portion of the circumferential surface of the insulation wall. The insulation wall cover 104 may have a side opening in a surface that faces the water tank 51. An extension tube of the evaporator 134 may penetrate through the side opening.

An opening through which the user puts the beverage making pack 12 into the fermentation tank 112 may be defined in an upper portion of the insulation wall cover 104 and an upper side of the fermentation tank 112, and a fermentation module cover 105 may cover the opening. The fermentation module cover 105 may be integrated with the fermentation tank cover 114 of FIG. 2 or may be provided as a separate part.

When the fermentation module cover 105 and the fermentation tank cover 114 are integrated with each other, the fermentation module cover 105 and the fermentation tank cover 114 may be collectively defined as a fermentation tank cover. When the fermentation module cover 105 and the fermentation tank cover 114 are provided as separate parts, the fermentation module cover 105 may have a dual structure covering an upper portion of the fermentation tank cover 114.

According to an embodiment, a fermentation module cover locker or lock 109 may be provided on an upper portion of the fermentation module cover 105. For example, the fermentation module cover lock 109 may be rotatably arranged on the upper portion of the fermentation module cover 105. When the user rotates fermentation module cover lock 109 in a first direction, the fermentation module cover 105 may be locked to the fermentation tank 112 or the fermentation tank cover 114. When the user rotates the fermentation module cover locker 109 in a second direction opposite the first direction, the fermentation tank module cover 105 may be unlocked.

The fermentation module cover 105 may be hinge-coupled to the fermentation tank 112 or the insulation wall cover 104. When the fermentation module cover 105 is unlocked, the fermentation module cover 105 may rotate upward with respect to a hinge part or hinge (see reference numeral 105A of FIG. 3) and may then be opened. The hinge 105A may have substantially the same attributes as hinge parts or hinges 38A, 38B, and 38C, which will be described below in FIG. 7. That is, the hinge 105A may include a hinge shaft, a hinge shaft connection part, and a torsion spring.

The water tank 51 may be provided above the base 100 and spaced apart from the base 100. The water tank 51 may be vertically spaced apart from the base 100. A space in which at least one of the compressor 131, the water supply heater 53, and the water supply pump 52 is accommodated may be defined between the water tank 51 and the base 100. Also, the water tank 51 may be horizontally spaced apart form the insulation wall.

The beverage maker may further include a water tank support 106 that supports the base 100 and spaces the water tank 51 from the base 100. The water tank support 106 may be provided on the base 100 and may support the water tank 51 so that the water tank 51 is spaced apart from the base 100 above the base 100. A lower end of the water tank support 106 may be mounted on the base 100, and the water tank 51 may be mounted on the water tank support 106.

A water tank cover 108 configured to open and close the water tank 51 with respect to the outside may be provided at an upper side of the water tank 51 and on an upper portion of the water tank support 106. Similar to the fermentation module cover 105, a water tank cover locker or lock 110 may be arranged on an upper portion of the water tank cover 108. For example, the water tank cover lock 110 may be rotatably provided on the upper portion of the water tank cover 108. When the user rotates water tank cover lock 109 in a first direction, the water tank cover 108 may be locked to the water tank 51 or the water tank support 106. When the user rotates the water tank cover lock 109 in a second direction opposite the first direction, the water tank cover 108 may be unlocked.

The water tank cover 108 may be hinge-coupled to the water tank 51 or the water tank support 106. When water tank cover 108 is unlocked, the water tank cover 108 may rotate upward with respect to a hinge part or hinge (see reference numeral 108A of FIG. 3) and then be opened. The hinge 108A may have substantially the same constituent as hinges 38A, 38B, and 38C, which will be described below in FIG. 7. That is, the hinge 108A may include a hinge shaft, a hinge shaft connection part, and a torsion spring.

The supplier 3 may be located between the fermentation module 1 and the water tank 51. In this case, when compared with a case in which the beverage maker is located at a different position, the beverage maker may be more compact, and the supplier 3 may be protected by the fermentation tank cover 114 and the water tank 51. Also, when each of the fermentation module 1 and the water supply module 5 has a cylindrical shape, a portion of a side surface of the supplier 3 provided between the fermentation module 1 and the water supply module 5 may be rounded inward along the fermentation module 1 and the water supply module 5, thereby further compacting a size of the beverage maker. This will be described in more detail with reference to FIGS. 3 to 5.

The supplier 3 may be provided above the base 100 and vertically spaced apart from the base 100. The supplier 3 may include an ingredient accommodation body (see reference numeral 36 of FIG. 5) in which the beverage ingredient or ingredients are accommodated, or the capsule 7 containing the beverage ingredient or ingredients are detachably accommodated, and a lid module 37 that covers the ingredient accommodation pocket.

The lid module 37 may include a lid 38 that covers the ingredient accommodation body 36. The lid 38 may be slidably or rotatably provided on the ingredient accommodation body 36. The lid 38 may be hinge-coupled to the ingredient accommodation body 36. The supplier 3 may be installed in an approximately central upper portion of the beverage maker, and the user may rotate the lid module 37 of the supplier 3 to easily mount or separate capsules C1, C2, and C3.

The beverage maker may have an accommodation space in which a plurality of parts is accommodated. Here, the accommodation space may be a space between the insulation wall and the water tank 51 in a horizontal direction and between the supplier 3 and the base 100 in a vertical direction.

The plurality of parts of the beverage maker may be accommodated in the accommodation space. In this case, the beverage maker may be compact. The plurality of parts accommodated in the accommodation space may be protected by being surrounded by the insulation wall and the water tank 51, the base 100 and the supplier 3, and a center cover 66 and a rear cover 107.

The opening/closing valves 313, 323, and 333 respectively installed in the supplier water supply passages 311, 321, and 331 to open and close the supplier water supply passage 311, 321, and 331 may be arranged below the ingredient accommodation body 36. The dispenser 62 may be mounted on the center cover 66. The dispenser 62 may protrude forward from the center cover 66.

The center cover 66 may be a front cover that is integrated with the insulation wall cover 104 and the water tank support 106. In this case, the front cover and the rear cover 107 may be coupled to each other to define front and rear outer appearances of the beverage maker.

The capsule 7 of FIG. 1 may represent the capsules C1, C2, and C3 of FIG. 2. The capsule 7 may include a capsule body 71, an upper cover 72, and a lower cover 73. The capsule body 71, the upper cover 72, and the lower cover 73 may seal the inside of the capsule from the outside to prevent the beverage ingredient accommodated in the capsule from being deteriorated or preventing the beverage ingredient from leaking to the outside.

The capsule body 71 may define an inner space of the capsule 7 and may also define a side surface of the capsule 7. The capsule body 71 may be made of a plastic material such as polypropylene (PP), polyethylene terephthalate (PET), and the like, for example, to effectively protect the inside of the capsule, thereby preventing the capsule from being damaged or broken down by a predetermined impact. According to an embodiment, the capsule body 71 may be made of aluminum.

The capsule body 71 may include an upper bonding part to which the upper cover 72 is bonded, a body part disposed below the upper bonding part to define the side surface of the capsule 7, and a lower bonding part which is provided below the body part to provide an opening in a lower portion of the capsule 7 and to which the lower cover 73 is bonded. The upper bonding part and the lower bonding part may have a predetermined length in a horizontal direction so that the upper cover 72 and the lower cover 73 are effectively bonded to each other. For example, in order to allow the user to more easily separate the capsule from the ingredient accommodation part, the upper bonding part may have an outer diameter greater than that of an upper end of the body part.

According to an embodiment, in order to minimize a loaded space of the capsule 7, and reduce an amount of lower cover 73 to be used when being manufactured, the lower bonding part may have the same outer diameter as that of a lower end of the body part, and the lower bonding part may have an inner diameter (or a diameter of the opening) less than an inner diameter or a minimal inner diameter of the lower end of the body part. The body part may have a width that gradually decreases downward. For example, the body part may have a cylindrical shape having a width of each of the outer and inner diameters, which gradually decreases downward, but is not limited thereto.

Since the capsule 7 may include the lower cover 73 so that the lower portion of the capsule 7 is more easily punched (cut), the beverage ingredient within the capsule may be more easily discharged. The upper cover 72 and the lower cover 73 may be made of a material that is easily punched by an upper punching member and a lower punching member, respectively. For example, each of the upper cover 72 and the lower cover 73 may be made of a soft material such as aluminum foil or a polyethylene (PE) film. Each of the upper cover 72 and the lower cover 73 may have strength less than that of the capsule body 71.

In this case, when each of the upper cover 72 and the lower cover 73 is punched by the punching member, a portion coming into contact with the punching member as well as a portion adjacent thereto may be cut. Also, when water is introduced through the cut upper cover 72, the cut area of each of the upper cover 72 and the lower cover 73 may be expanded by a pressure of the introduced water. As a result, water or air may be more easily introduced into the capsule 7 through the upper portion of the capsule 7, and thus, the beverage ingredient may be more easily discharged through the lower portion of the capsule 7.

The beverage ingredient may be accommodated in the capsule 7. The beverage ingredient accommodated in the capsule 7 may be in a liquid or powder form. When the upper cover 72 and the lower cover 73 are cut, the beverage ingredient may be discharged to supplier extraction passages 312, 322, and 332 through the lower portion of the capsule 7.

Figure 3:
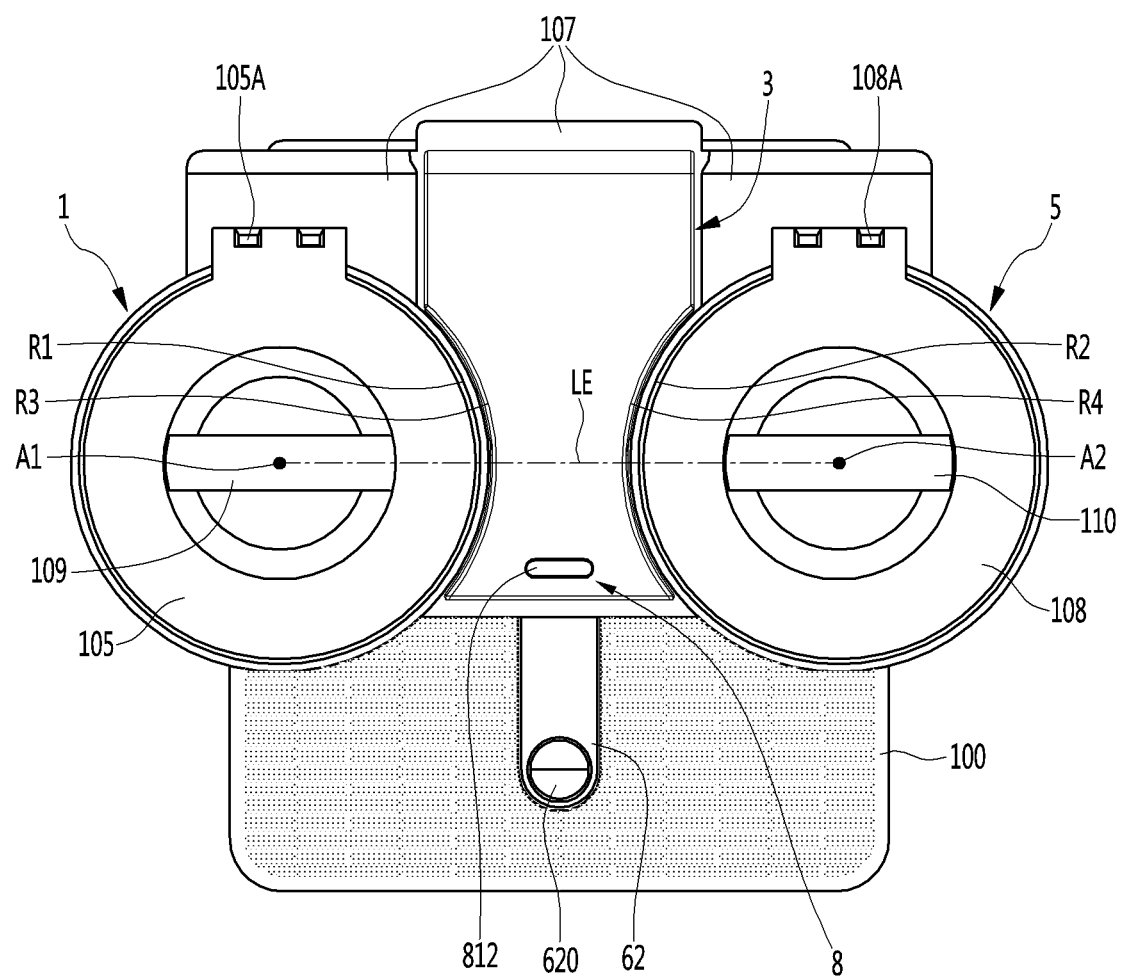
FIG. 3 is a plan view of the beverage maker of FIG. 1.
Figure 4:
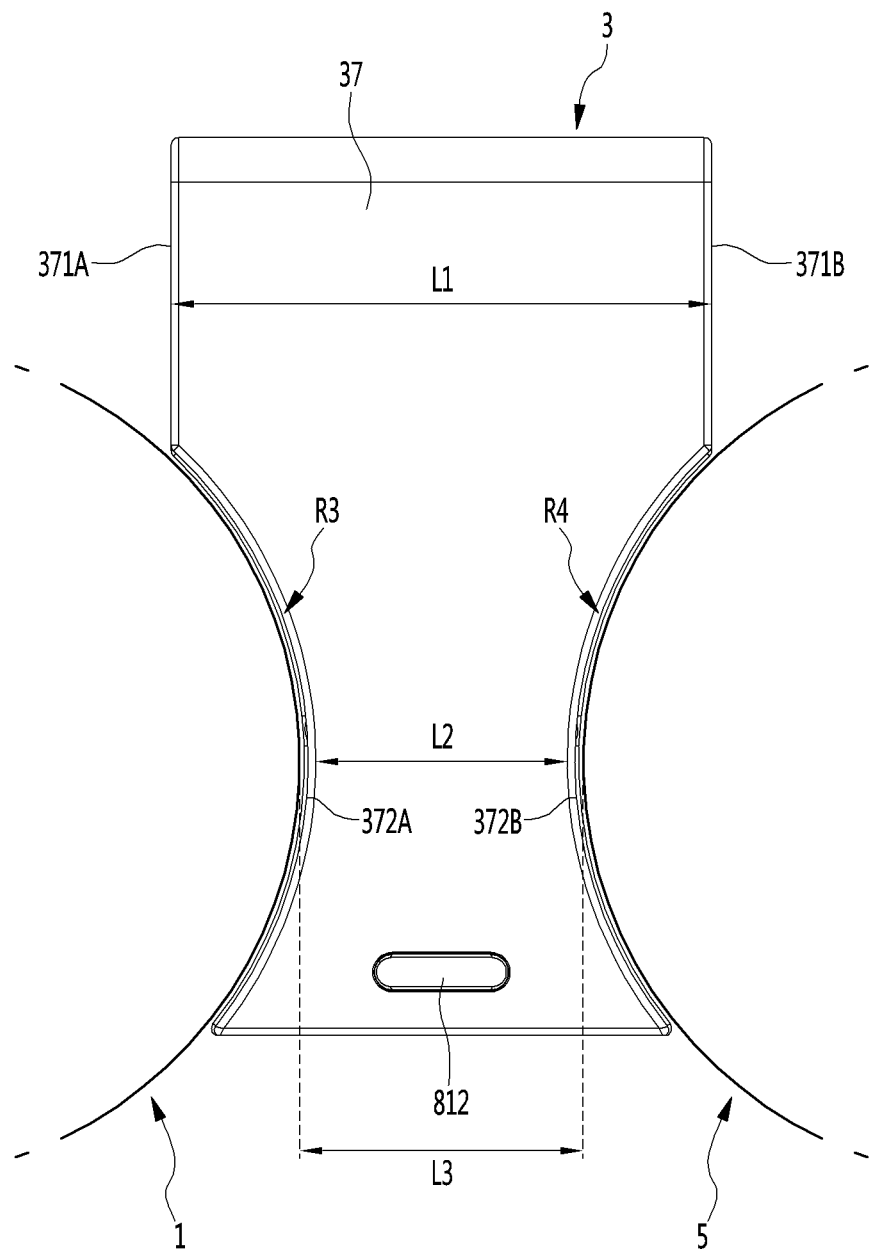
FIG. 4 is a plan view of a supplier according to an embodiment.
Figure 5:
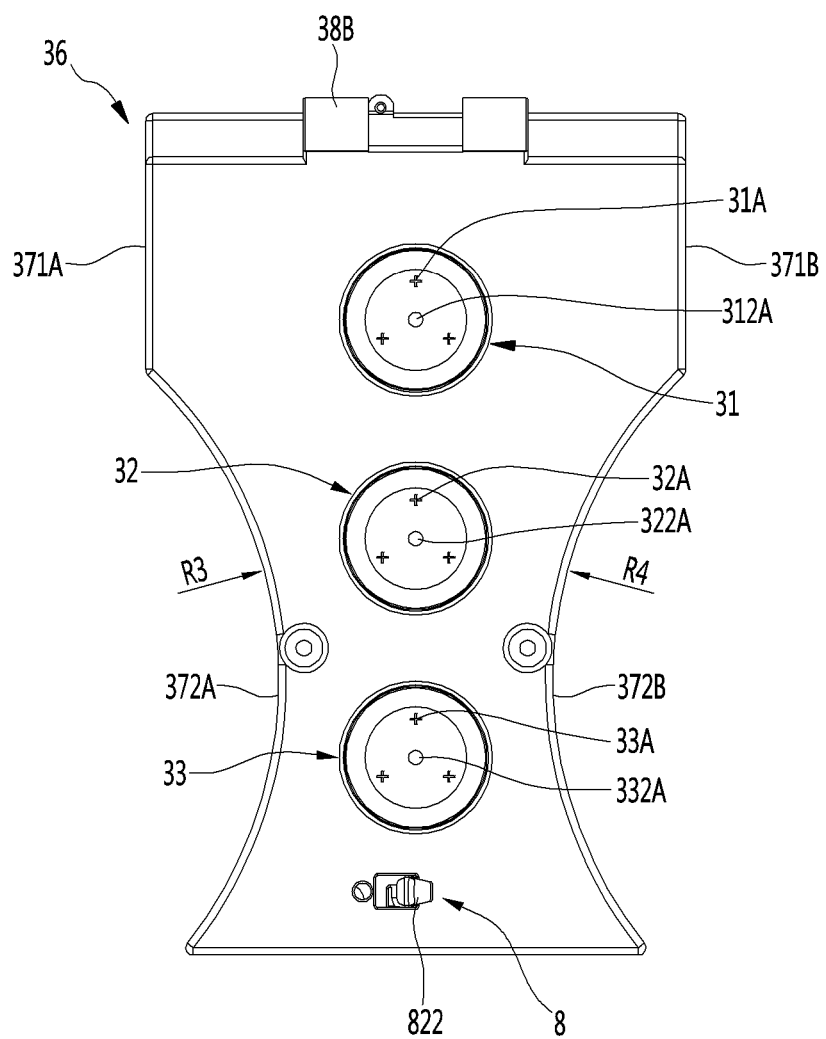
FIG. 5 is a plan view illustrating an ingredient accommodation body of the supplier when a lid module of the supplier is unlocked according to an embodiment.

FIG. 3 is a plan view of the beverage maker of FIG. 1, FIG. 4 is a plan view of the supplier according to an embodiment, and FIG. 5 is a plan view illustrating the ingredient accommodation body of the supplier when the lid module of the supplier is unlocked according to an embodiment. Referring to FIGS. 3 and 4, the fermentation tank 112, the insulation wall cover 104 surrounding and the fermentation tank 112, and the fermentation tank assembly 11 including the fermentation module cover 105 covering the fermentation tank 112 may be provided on one side (for example, a left side with respect to a front surface of the beverage maker) of the beverage maker. Also, the water tank 51, the water tank support 106 surrounding the water tank 51, and the water tank assembly including the water tank cover 108 covering the water tank 51 may be disposed on the other side (for example, a right side with respect to the front surface of the beverage maker) of the beverage maker.

In this case, the supplier 3 in which the beverage ingredient or the capsule 7 containing the beverage ingredient is accommodated may be provided between the fermentation tank assembly 11 and the water tank assembly in consideration of the overall balance and the beauty of the beverage maker. Each of the fermentation tank 112 and the water tank 51 may have an inner space. In this specification, although it is assumed that each of the fermentation tank 112 and the water tank 51 has a cylindrical shape to provide an inner space, the embodiment is not limited to the cylindrical shape of each of the fermentation tank 112 and the water tank 51.

When each of the fermentation tank 112 and the water tank 51 has a cylindrical shape, each of the insulation wall cover 104 surrounding the fermentation tank and the water tank support 106 surrounding the water tank 51 may also have a cylindrical shape. That is, the overall shape of each of the fermentation tank assembly 11 and the water tank assembly may have a cylindrical shape.

When the supplier 3 is arranged between the fermentation tank assembly 11 and the water tank assembly, the fermentation tank 112 and the water tank 51 may be spaced apart from each other. The larger the distance between the fermentation tank 112 and the water tank 51, the larger the size of the beverage maker.

When the supplier 3 is arranged at a rear side of the fermentation tank assembly 11 and the water tank assembly, the distance between the fermentation tank 112 and the water tank 51 may be reduced. However, in this case, it may be more difficult for the user to insert the beverage ingredient or the capsule 7 containing the beverage ingredient into the supplier 3. Also, a length between the front and rear surfaces of the beverage maker may increase to increase the entire size of the beverage maker.

To solve the above-described problems, the supplier 3 may be provided between the fermentation tank assembly 11 and the water tank assembly and may have a shape that is capable of reducing the spaced distance between the fermentation tank 112 and the water tank 51. When the supplier 3 is provided between the fermentation tank assembly 11 and the water tank assembly, the supplier 3 may include first surfaces 371A and 372A that face the fermentation tank 112 and second surfaces 371B and 372B that face the water tank 51.

The first surfaces 371A and 372A may include a first accommodation space 372A against which at least a portion of the fermentation tank 112 or the fermentation tank assembly 11 is accommodated, and the second surfaces 371B and 372B may include a second accommodation space 372B against which at least a portion of the water tank assembly is accommodated. The first accommodation space 372A and the second accommodation space 372B may be recessed inward.

Referring to FIG. 3, a curvature of the fermentation tank 112 or the fermentation tank assembly 11 having the cylindrical shape may be a first curvature R1, and a curvature of the water tank 51 or the water tank assembly may be a second curvature R2. In this case, each of the first accommodation space 372A and the second accommodation space 372B may be recessed inward at a predetermined curvature.

When the curvature of the first accommodation space 372A is defined as a third curvature R3, and the curvature of the second accommodation space 372B is defined as a fourth curvature, the third curvature R3 may be equal to or less than the first curvature R1, and the fourth curvature R4 may be equal to or less than the second curvature R2. When considering the overall appearance of the beverage maker or a foreign substance trapping phenomenon, the third curvature R3 may be equal to the first curvature R1, and the fourth curvature R4 may be equal to the second curvature R2.

In this case, a maximally spaced distance L1 between the first surface 371A and the second surface 371B may be greater than a minimally spaced distance L2 between the first accommodation space 372A and the second accommodation space 372B. Also, the maximally spaced distance L1 may be greater than a minimally spaced distance L3 between the fermentation tank 112 or the fermentation tank assembly 11 and the water tank 51 or the water tank assembly. In other words, a first width of the supplier at a rear of the supplier may be greater than or equal to a second width of the supplier at a front of the supplier, and the second width of the supplier may be greater than a third width of the supplier, the third width being at a portion between the first and second widths. Alternatively, the second and third widths may be equal to each other, and the first width may be greater than the second and third widths.

That is, the supplier 3 arranged between the fermentation tank assembly 11 and the water tank assembly may occupy a reduced space between the fermentation tank assembly 11 and the water tank assembly to realize a more compact beverage maker. Also, the lever 620 provided in the dispenser 62 to dispense the beverage may be provided at a front side between the fermentation tank 112 and the water tank 51. Thus, the user may be conveniently manipulate the lever 620 and also maintain the entire balance of the outer appearance of the beverage maker.

Referring to FIG. 5, the ingredient accommodation body 36 of the supplier 3 may include at least one or more ingredient accommodation pockets 31, 32, and 33 to distinguish at least one or more ingredients from each other to accommodate the ingredients. The ingredient accommodation pockets 31, 32, and 33 may have accommodation spaces to accommodate the beverage ingredient or the capsule containing the beverage ingredient and may include punching pars 31A, 32A, and 33A and lower guides 312A, 322A, and 332A configured to guide the beverage ingredient to the main passage 2.

As illustrated in FIG. 5, the ingredient accommodation pockets 31, 32, and 33 may be arranged in a line in a direction perpendicular to the direction in which the fermentation tank 112 and the water tank 51 are spaced apart from each other. Thus, the spaced distance between the first surfaces 371A and 372A and the second surfaces 371B and 372B may be minimized to reduce a size of the beverage maker.

Figure 6:
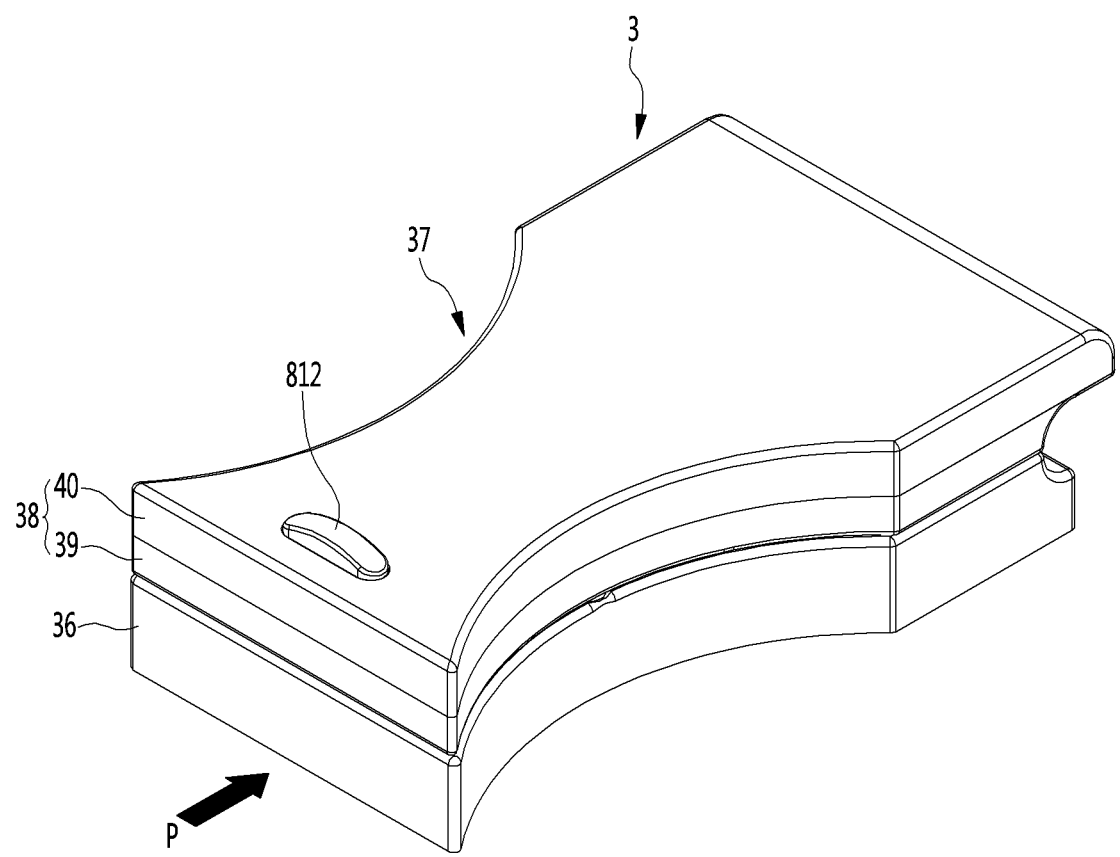
FIGS. 6 to 7 are perspective views of the lid module of the supplier when the lid module is locked and unlocked according to an embodiment.
Figure 7:
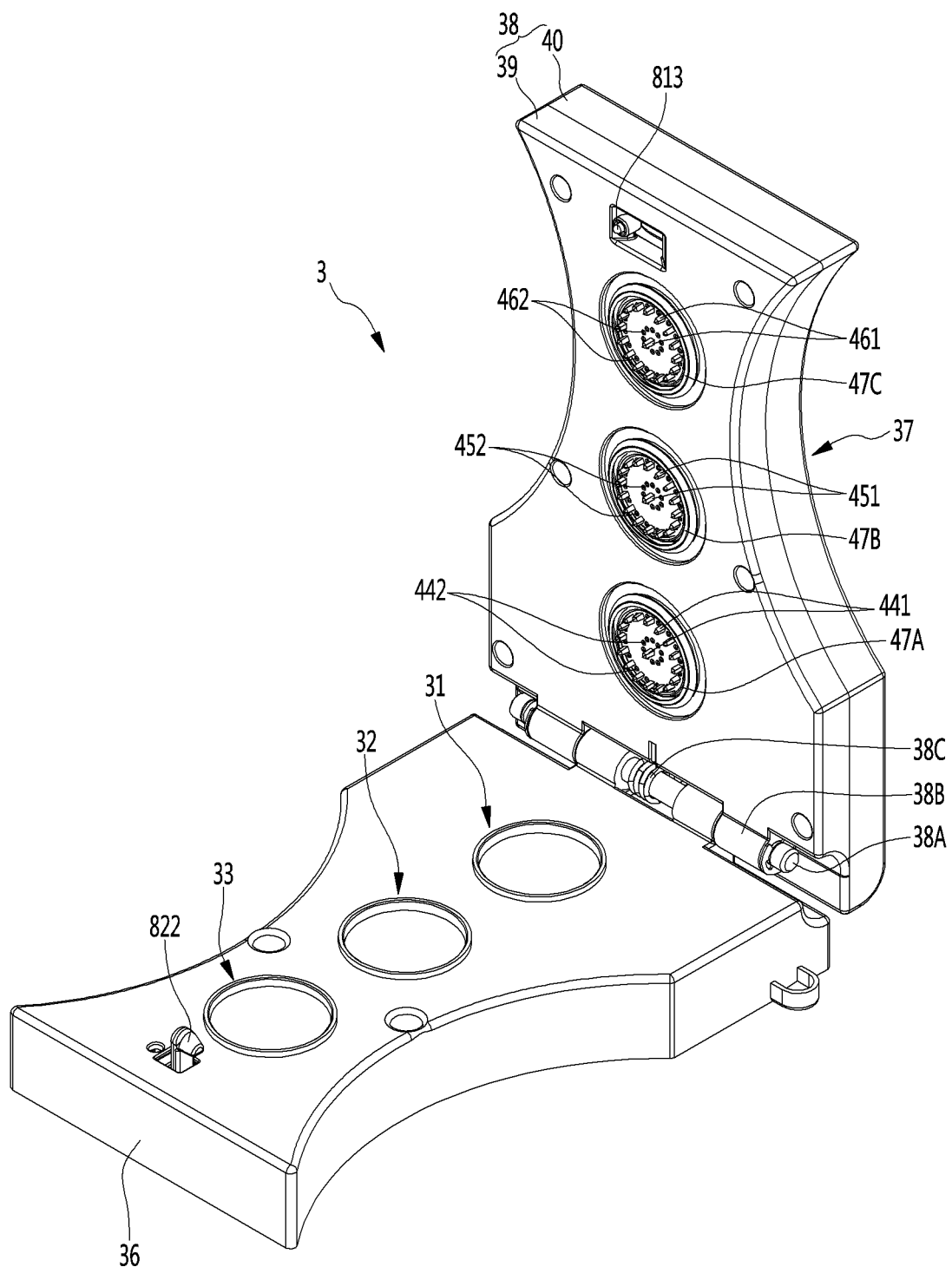

FIGS. 6 to 7 are perspective views of the lid module of the supplier when the lid module is locked and unlocked according to an embodiment. Before describing locking and unlocking of the lid module, the supplier 3 of FIGS. 6 and 7 will be described first.

Referring to FIGS. 6 and 7, the supplier 3 may include the ingredient accommodation body 36 in which the ingredient accommodation pockets 31, 32, and 33 in which the beverage ingredient or the capsule containing the beverage ingredient is accommodated are provided and a lid module 37 that covers the ingredient accommodation pockets 31, 32, and 33. The lid module 37 may include a lid 38 that covers the ingredient accommodation body 36. The lid 38 may be slidably or rotatably provided on the ingredient accommodation body 36. The lid 38 may be hinge-coupled to the ingredient accommodation body 36.

The lid 38 may be provided as an assembly of a plurality of members. For example, the lid 38 may include a lower lid 39 and an upper lid 40. At least one of the lower lid 39 and the upper lid 40 may be connected to the ingredient accommodation body 36.

For example, the lid 38 may be hinge-coupled (38A and 38B) to the ingredient accommodation body 36. A hinge shaft 38A may be provided on one of the lid 38 and the ingredient accommodation body 36. The hinge shaft 38A may be horizontally arranged with respect to one of the lid 38 and the ingredient accommodation body 36. A hinge shaft connection part (or flange) 38B rotatably supported by the hinge shaft 38A may be provided on the other one of the lid 38 and the ingredient accommodation body 36.

The lid 38 may vertically rotate with respect to the hinge shaft 38A. The lid 38 may have an area greater than the sum of areas of the ingredient accommodation pockets 31, 32, and 33 and may rotate about the hinge shaft 38A to open or close all of the ingredient accommodation pockets 31, 32, and 33. According to an embodiment, the hinge shaft 38A may further include a torsion spring 38C that surrounds the outside of the hinge shaft 38A to press the upward rotation of the lid 38.

When the user pushes a button 812, the lid 38 may be unlocked. As the lid 38 is unlocked, the lid 38 hinge-coupled to the ingredient accommodation body 36 may rotate to the upper side of the ingredient accommodation body 36. When the lid rotates upward, the ingredient accommodation pockets 31, 32, and 33 provided in the ingredient accommodation body 36 may be opened to the outside. The ingredient accommodation pockets 31, 32, and 33 may provide the ingredient accommodation space in which the beverage ingredient is accommodated or the capsule accommodation space in which the capsule containing the beverage ingredient is accommodated.

Referring to FIG. 5, the ingredient accommodation pockets 31, 32, and 33 may be provided between the locking module (or lock) 8 that includes a button 822 and the hinges 38A and 38B. The locking module 8 may be located adjacent to a side (a spaced side) different from a side on which the hinges 38A and 38B are located, on the ingredient accommodation body 36. Thus, the locking of the locking module 8 may be more stable, and a magnitude of the force required to lock the ingredient accommodation body may be reduced.

Also, referring to FIG. 3, the locking module 8 may be provided on the supplier 3 so that the locking module 8 is located at the front of an extension line LE connecting a central axis A1 of the fermentation tank 112 and a central axis A2 of the water tank 51. Thus, the user may more conveniently manipulate the button 822 of the locking module 8.

According to an embodiment, the hinge 105A provided in the fermentation module 1, the hinge 108A provided in the water supply module 5, and the hinges 38A and 38B provided in the supplier 3 may be arranged in parallel to each other. That is, the hinge shaft of the hinge 105A of the fermentation module 1, the hinge shaft of the hinge 108A of the water supply module 5, and the hinge shaft 38A of the hinges 38A and 38B of the supplier 3 may be arranged in parallel to each other.

Also, the fermentation module cover 105, the water tank cover 108, and the lid module 37 may rotate upward with respect to each of the hinges and thus may be opened. That is, the fermentation module cover 105, the water tank cover 108, and the lid module 37 may rotate in the same direction and thus be may opened.

To supply water or air into the ingredient accommodation pockets 31, 32, and 33, the lid module 37 may include at least a portion of the supplier water supply passages 311, 321, and 331 of FIG. 2. For example, at least a portion of the supplier water supply passages 311, 321, and 331 may be located in a space between the lower lid 39 and the upper lid 40. Also, the lid module 37 may include a water supply body connected to the supplier water supply passages 311, 321, and 331 to inject the water or the air supplied from the supplier water supply passages 311, 321, and 331 into the ingredient accommodation part.

The water supply body may be provided for each of the ingredient accommodation pockets 31, 32, and 33 so that one water supply body corresponds to one ingredient accommodation part. A lower portion of the water supply body may have a circular plate shape. A plurality of upper punching parts (or upper punches) 441, 451, and 461 configured to punch the upper cover 72 of the capsule 7 and a plurality of water supply holes configured to guide the fluid (the water or the air) to the ingredient accommodation part 31 may be provided in or at the bottom surface of the water supply body.

Each of the plurality of water supply holes may be provided as a hole having a predetermined size in the bottom surface of the water supply body. The fluid introduced into the water supply body may be supplied to the upper surface of the capsule through the plurality of water supply holes, and the fluid supplied to the upper surface of the capsule may be guided to the inside of the capsule through the respective hole created by each respective upper punch of the plurality of upper punches 441, 451, and 461.

The lid module 37 may include at least one sealing member (or seal) provided between the top surface of the ingredient accommodation body 36 and the bottom surface of the lid module 37. Sealing members (or seals) 47A, 47B, and 47C located between the bottom surface of the water supply body and the top surface of the ingredient accommodation body 36 may be provided between the ingredient accommodation body 36 and the lid module 37. The seals 47A, 47B, and 47C may prevent the water or the beverage ingredient from leaking to an outside of the ingredient accommodation body 36 when the fluid is introduced. The plurality of upper punches 441, 451, and 461 and the seals 47A, 47B, and 47C may use at least one of the capsules C1, C2, and C3 and the ingredient accommodation pockets 31, 32, and 33 as a pressing part when the lid module 37 is closed.

Figure 8:
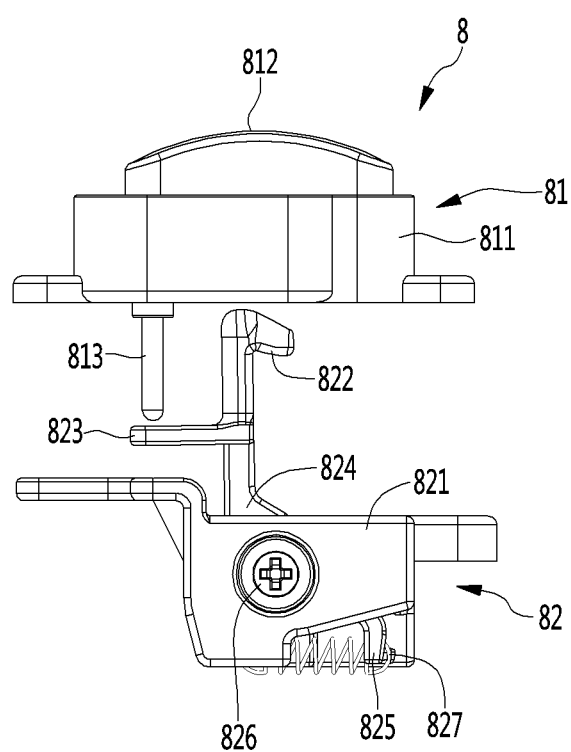
FIG. 8 illustrates a locking module provided in the supplier according to an embodiment.
Figure 9:
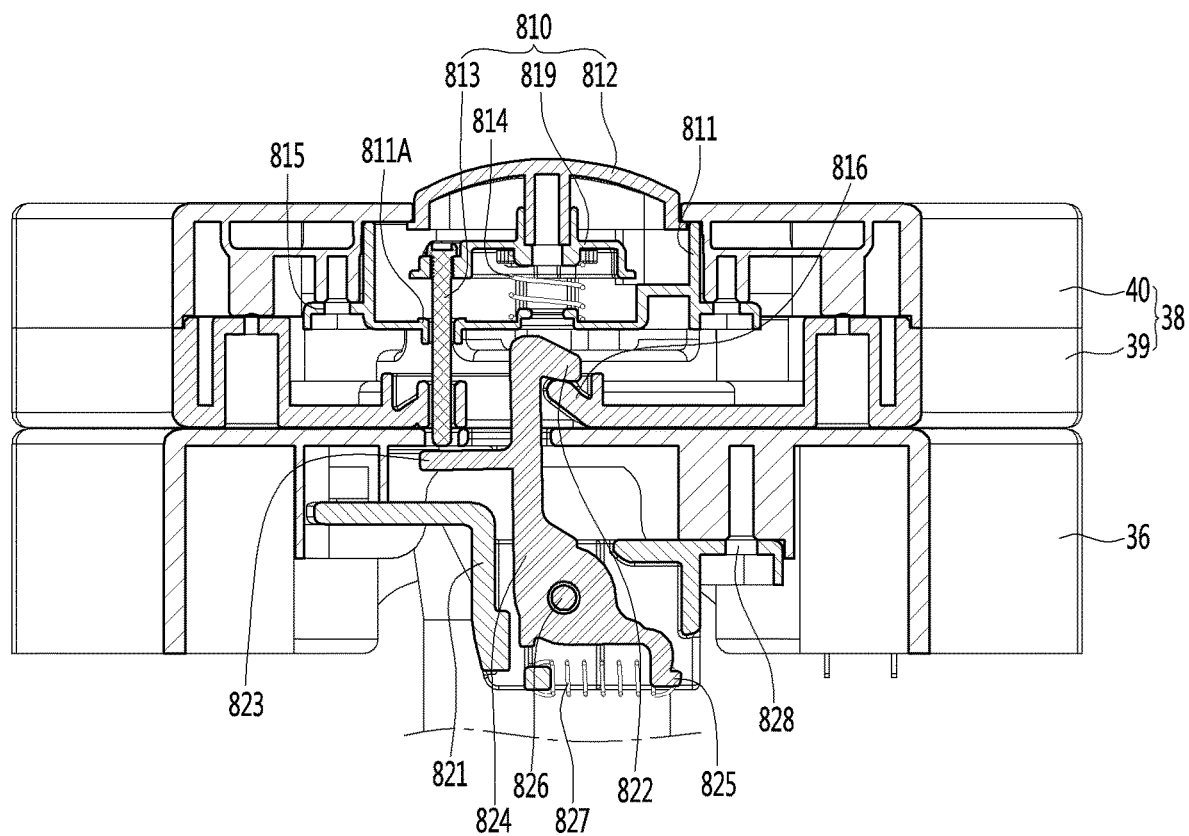
FIG. 9 is a cross-sectional view of the locking module when the lid module of the supplier is locked according to an embodiment.
Figure 10:
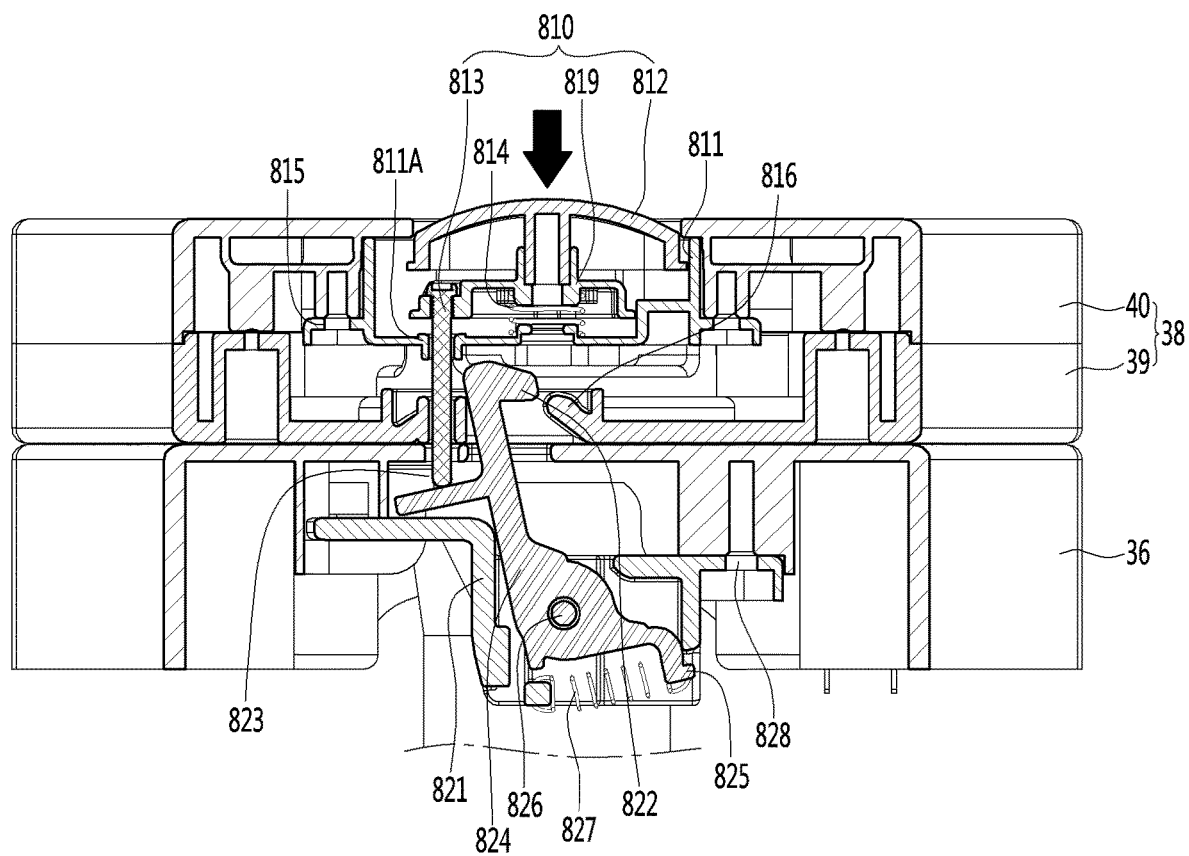
FIG. 10 is a cross-sectional view illustrating an operation of unlocking the lid module of the supplier according to an embodiment.

Hereinafter, features related to the locking and unlocking of the lid and an operation thereof according to an embodiment will be described in more detail with described with reference to FIGS. 8 to 10. FIG. 8 is a view of a locking module provided in the supplier according to an embodiment, FIG. 9 is a cross-sectional view of the locking module when the lid module of the supplier is locked according to an embodiment, and FIG. 10 is a cross-sectional view illustrating an operation of unlocking the lid module of the supplier according to an embodiment. The views of FIGS. 8 to 10 correspond to a front view and a cross-sectional view of the locking module when viewed from a point P of FIG. 6.

Referring to FIGS. 8 to 10, the lock 8 may lock and unlock the lid 38 to the ingredient accommodation body 36. The lock 8 may include an upper locking module 81 mounted on the lid 38 and a lower locking module 82 mounted on the ingredient accommodation body 36.

The upper locking module 81 may include a button part (or button) 810 that unlocks the lid 38 according to the user's manipulation and a button spring 814 that elastically supports the button 810. The button 810 may include a push button 812 that is pressed to the lid 38, a push pin 813 that presses a contact part (or contact lever) 823 of the lower locking module 82 to be described later when the button 812 is pressed, and a spring support plate 819 supported by the button spring 814. Each of the features of the button 810 may be integrally formed or may be connected or assembled with each other.

The button spring 814 may restore the button 812 to its original position (or height) when an external force acting on the button 812 is removed after the button 812 is pressed. For this, the button spring 814 may be a compression spring.

According to an embodiment, the upper locking module 81 may further include a spring sheet 811 which is mounted on the lid 38 and on which the button spring 814 is seated. Since the button spring 814 is seated on the spring sheet 811, the button part 810 supported by the button spring 814 may also be indirectly seated on the spring sheet 811. The spring sheet 811 may further include at least one coupling part (or coupler) 815 that is mounted or coupled to the lid 38.

According to an embodiment, as illustrated in FIG. 9, when the spring sheet 811 is arranged on a lower portion of the button 810, the spring sheet 811 may include a push pin through-hole 811A through which the push pin 813 passes. A hook part (or latch) 816 that is configured to be locked to and unlocked from a hook 822 of the lower locking module 82, which will be described later, may be provided on at least one of the lid 38 and the upper locking module 81. For example, as illustrated in FIG. 9, the latch 816 may protrude from at least one of the lid 38 and the upper locking module 81.

The lower locking module 82 may include a locking body 824. The locking body 824 may include a hook 822 that is configured to be locked to and unlocked from the hook part 816 and a contact part 823 that contacts the push pin 813 when the push pin 813 descends. The locking body 824 may be hinge-connected to the ingredient accommodation body 36 and configured to rotate.

Also, the lower locking module 82 may include a locking spring 827 that resists a rotation of the locking body 824 when the button 810 is pressed. The locking spring 827 may have a first end connected to or hooked to the ingredient accommodation body 36 and a second end connected to the locking body 824. For this, the locking body 824 may further include a locking spring hook part (or locking spring hook) 825 connected to the second end of the locking spring 827. The locking spring 827 may be a tension spring.

According to an embodiment, the lower locking module 82 may include a lower body 821 mounted thereon. The lower body may be coupled to the ingredient accommodation body 36 through a lower body coupling part (or lower body coupler) 828 and thus may be fixed to the ingredient accommodation body 36. In this case, the locking body 824 may be hinge-coupled to the lower body 821, and the first end of the locking spring 827 may be connected to the lower body 821 or hooked to the lower body 821.

When the lid 38 covers the ingredient accommodation parts 31, 32, and 33, a bottom surface of the latch 816 and a top surface of the hook 822 may come into contact with each other. An inclined surface along which the hook 822 passes over the latch 816 may be provided on at least one of the bottom surface of the latch 816 and the top surface of the hook 822. That is, when the bottom surface of the latch 816 and the top surface of the hook 822 come into contact with each other, the locking body 824 may rotate to allow the hook 822 to pass over the latch 816. When the hook 822 passes over the latch 816, the locking spring 827 may rotate the locking body 824 in the direction in which the hook 822 is locked to the latch 816. As a result, the hook 822 may be locked to the latch 816 to allow the lid 38 to be locked to the ingredient accommodation body 36. That is, although the user may press the lid 38 only to cover the ingredient accommodation parts 31, 32, and 33, the lid 38 may be locked to the ingredient accommodation body 36 to improve the user's convenience.

The unlocking of the lid 38 will be described with reference to FIG. 10. Referring to FIG. 10, when the user presses the button part 810 or the button 812 downward, the button spring 814 may be compressed to allow the button part 810 to move downward. While the push pin 813 of the button part 810 moves downward, the contact lever 823 of the lower locking module 82 may be pressed. As the contact lever 823 is pressed, the locking body 824 may rotate to allow the hook 822 to be unlocked from the latch 816, and the locking spring 827 connected to the locking body 824 may be extended.

As the locking body 824 rotates in the unlocking direction, the lid 38 may be unlocked from the ingredient accommodation body 36. As the lid 38 is unlocked from the ingredient accommodation body 36, the torsion spring 38C surrounding the outside of the hinge shaft 38A of FIG. 7 may cause an upward rotation of the lid 38. When the lid rotates upward by the torsion spring 38C, the ingredient accommodation pockets 31, 32, and 33 of the ingredient accommodation body 36 may be opened.

That is, since the lid 38 automatically rotates upward to be opened when the lid 38 is unlocked, the user's convenience may be improved without performing a separate operation to physically lift the lid 38. When the lid 38 rotates upward, the push pin 813 and the contact lever 823 may not come into contact with each other any more. In this case, the locking spring 827 may press the locking body 824 in the direction in which the locking spring 827 is compressed, and the locking body 824 may rotate by the pressing of the locking spring 827 to return to its original position.

Figure 11:
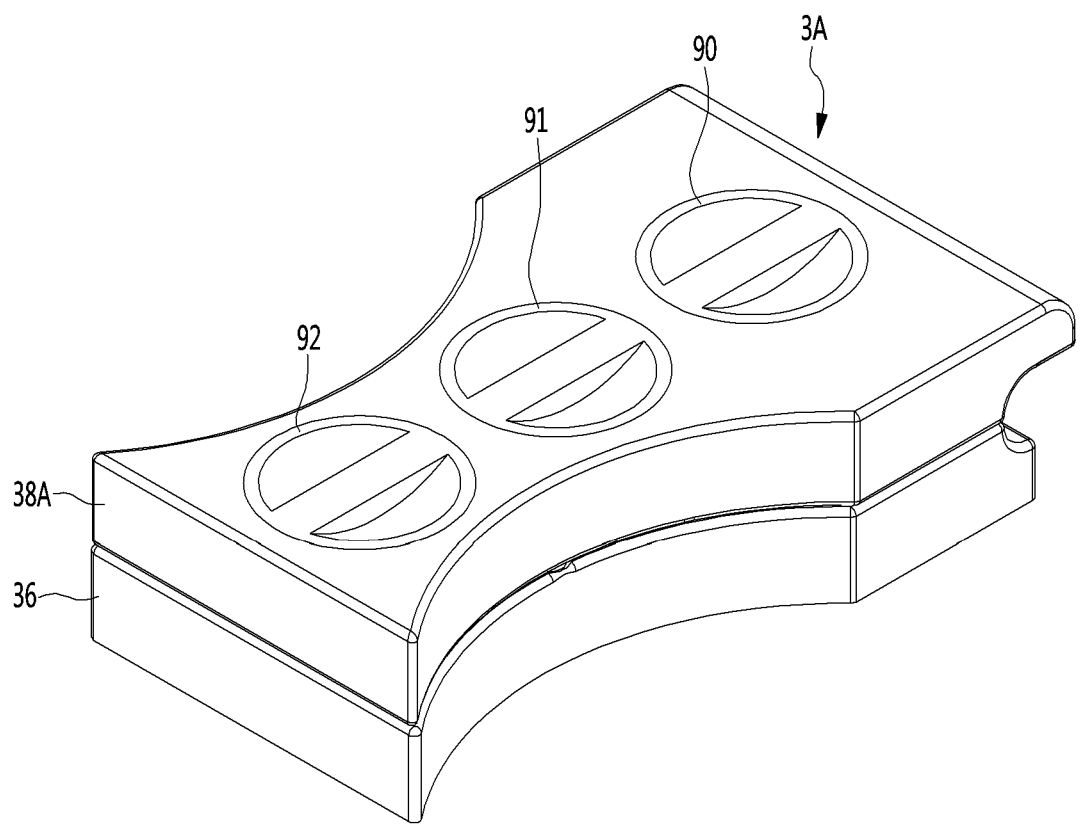
FIG. 11 is a perspective view of a supplier including a locker according to another embodiment.
Figure 12:
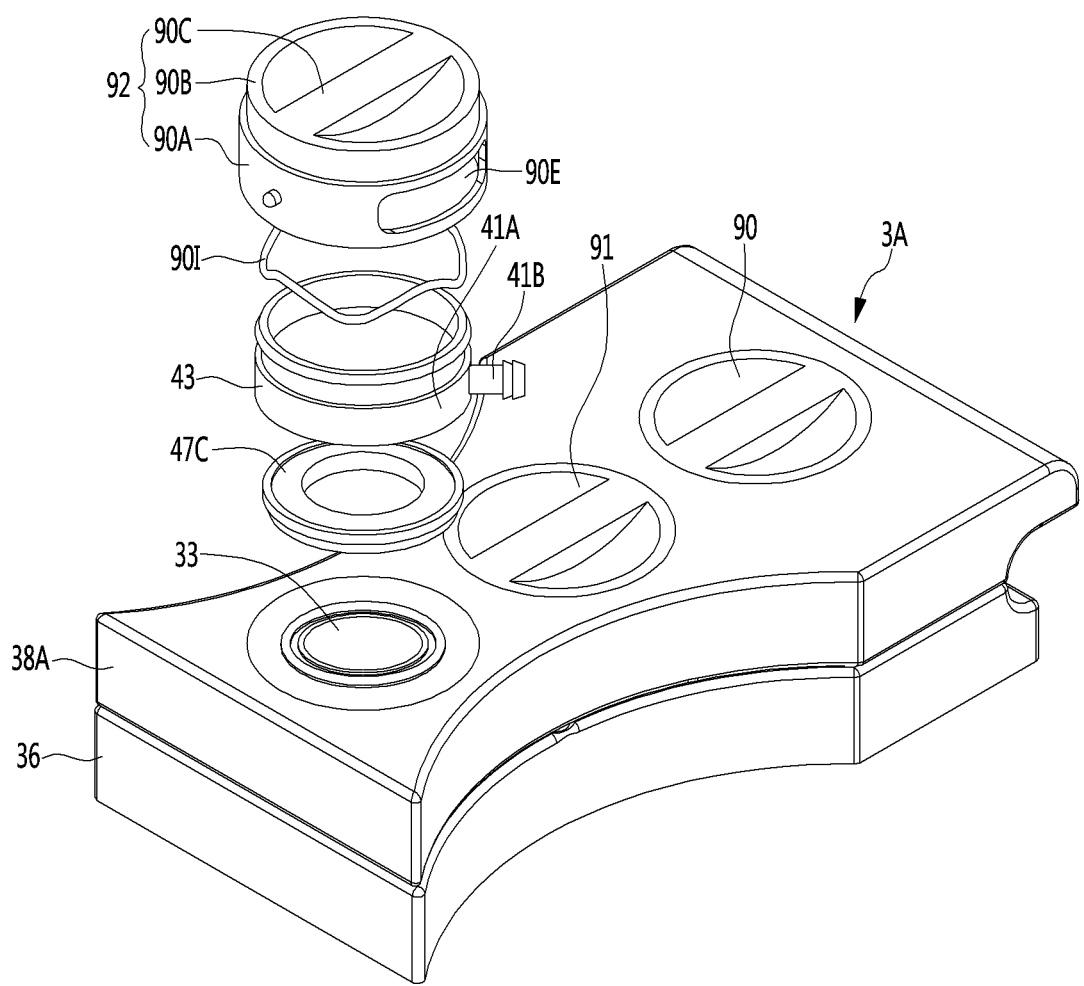
FIG. 12 is a partial exploded perspective view of the supplier of FIG. 11.

FIG. 11 is a perspective view of a supplier including a locker according to another embodiment, and FIG. 12 is a partial exploded perspective view of the supplier of FIG. 11. Referring to FIGS. 11 and 12, a lid module of a supplier 3A may include an ingredient accommodation body 36 rotatably provided on a lid 38A and at least one or more lockers (or locks) 90, 91, and 92 that may be locked to or unlocked from the ingredient accommodation body 36.

Although one lid 38A is illustrated in FIGS. 11 and 12, the lid 38A according to an embodiment may include an upper lid and a lower lid as described above with reference to FIG. 6. At least one or more water supply bodies 41, 42, and 43 may be provided on the lid 38A, and the at least one or more locks 90, 91, and 92 may be rotatably provided with respect to the water supply bodies. The lid 38A may be provided as an assembly of a plurality of members.

A through-hole through which a lower portion of each of the locks 90, 91, and 92 passes and a support wall surrounding at least a portion of an outer surface of each of the locks 90, 91, and 92 may be provided in/on the lid 38A. The water supply bodies 41, 42, and 43 may be connected to a water supply passage 4 through supplier inlet passages 311, 321, and 331. The water supply bodies 41, 42, and 43 may include a body 41A in which an inner water supply passage is provided and a connection part or nipple 41B that guides water to the inner water supply passage.

The body 41A may have a circular plate shape and may be provided in the locker. The connection nipple 41B may protrude from the body 41A. The connection nipple 41B may protrude from a circumferential surface of the body 41A. The connection nipple 41B may be connected to the supplier inlet passages 311, 321, and 331.

At least one or more sealing members (or seals) 47A, 47B, and 47C closely attached to the top surface of the ingredient accommodation body 36 and the bottom surface of the water supply bodies 41, 42, and 43 may be provided between the ingredient accommodation body 36 and the water supply bodies 41, 42, and 43. The lid module may include at least one or more locks 90, 91, and 92.

The locks 90, 91, and 92 may rotate about a center of a vertical central axis. When the user rotates one or more of the lockers 90, 91, and 92 in the locking direction, the locks 90, 91, and 92 may press the water supply bodies 41, 42, and 43 in a direction that is close to the ingredient accommodation pockets 31, 32, and 33, and the water supply bodies 41, 42, and 43 may be pressed to a capsule accommodated in each of the ingredient accommodation pockets 31, 32, and 33.

The locks 90, 91, and 92 may include a hollow box 90A that provides a space in which the water supply body is accommodated and surrounds an outer circumferential surface of the water supply body and an upper plate part (or upper plate) 90B provided on an upper portion of the hollow box 90A. The locks 90, 91, and 92 may further include a handle part (or handle) 90C that protrudes from the upper plate 90B.

The hollow box 90A may be inserted into a hook part provided on the ingredient accommodation body 36 and thus may be locked to or unlocked from the hook part. When the hollow box 90A is restricted on the hook part, the lid module may be locked. When the restriction of the hollow box 90A is released, the lid module may be unlocked.

An avoid hole (or through hole) 90E that allows the connection nipple 41B provided on the water supply body to pass through may be defined in the hollow box 90A. The through hole 90E may be defined in a portion of the hollow box 90A or may be defined in a circumferential direction along the hollow box 90A.

A top surface of the upper plate 90B and the handle 90C may be exposed to the outside of the lid 38A. The user may rotate the handle 90C in a clockwise direction or counterclockwise direction to allow the locks 90, 91, and 92 to be locked to or unlocked from the ingredient accommodation body 36.

The lid module may further include a spring 901 provided between the water supply body and the upper plate 90B of each of the locks 90, 91, and 92. When an external force is not applied to the spring 901, the upper plate 90B of each of the locks 90, 91, and 92 and the water supply body may be pushed in directions opposite to each other. The spring 901 may be a plate spring having a ring shape.

The passages such as the main passage 2, the water supply passage 4, the beverage dispensing passage 61, the gas dispensing passage, the air injection passage 81, and the like may each be a hose or tube, for example, through which a fluid passes or may be a plurality of hoses or tubes that are continuous in a longitudinal direction. In addition, the passage may be two hoses or tubes that include other features such as a control valve therebetween.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being included in the present invention.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker, comprising:
    a fermentation tank having an inner space defined therein;
    a water tank that supplies water to the fermentation tank; and
    an ingredient supply assembly provided between the fermentation tank and the water tank and configured to hold at least one beverage ingredient, wherein a first width of the ingredient supply assembly at a rear of the ingredient supply assembly is greater than a second width of the ingredient supply assembly, the second width being located at a minimum separation distance between the fermentation tank and the water tank, and wherein the ingredient supply assembly comprises:
    an ingredient accommodation body including an ingredient accommodation pocket in which the at least one beverage ingredient is accommodated;
    a lid configured to open and close the ingredient accommodation pocket; and
    a lock configured to lock the lid to the ingredient accommodation body when the lid is closed.

2. The beverage maker according to claim 1, wherein the ingredient supply assembly comprises a first surface that faces the fermentation tank and a second surface that faces the water tank, and the first surface and the second surface are concave surfaces that are recessed into the ingredient supply assembly.

3. The beverage maker according to claim 2, wherein the first surface has a curvature equal to or less than a curvature of the fermentation tank, and the second surface has a curvature equal to or less than a curvature of the water tank.

4. The beverage maker according to claim 2, wherein a maximum distance between the first surface and the second surface is greater than a minimum distance between the water tank and the fermentation tank.

5. The beverage maker according to claim 2, further including a beverage making pack provided within the fermentation tank.

6. The beverage maker according to claim 1, wherein the ingredient accommodation pocket comprises a plurality of ingredient accommodation pockets, and the plurality of ingredient accommodation pockets are arranged in a line in a first direction perpendicular to a second direction in which the water tank and the fermentation tank are spaced apart from each other.

7. The beverage maker according to claim 1, wherein the lock is provided at a front of the ingredient accommodation body, in front of an extension line that connects a center of the fermentation tank to a center of the water tank.

8. The beverage maker according to claim 7, further comprising:
    a dispenser configured to dispense a beverage stored in the fermentation tank; and
    a lever provided on the dispenser, wherein the dispenser is provided on a front surface of the ingredient accommodation body between the fermentation tank and the water tank, and the lever is configured to be manipulated to dispense the beverage.

9. The beverage maker according to claim 1, wherein the ingredient supply assembly further comprises a hinge comprising a hinge shaft and provided on one of the lid and the ingredient accommodation body and a hinge shaft connection flange provided on the other one of the lid and the ingredient accommodation body and rotatably supported by the hinge shaft, and the lid rotates upward with respect to the hinge to open the ingredient accommodation pocket.

10. The beverage maker according to claim 9, wherein the ingredient accommodation pocket is arranged between the lock and the hinge.

11. The beverage maker according to claim 9, wherein the hinge is provided on a first side of the ingredient supply assembly, and the lock is provided adjacent to a second side different from the first side on which the hinge is provided.

12. The beverage maker according to claim 9, further comprising:

a fermentation module cover that covers the fermentation tank;
a fermentation module hinge provided between the fermentation module cover and the fermentation tank and configured to rotate the fermentation module cover and thereby to open the fermentation tank;
a water tank cover covering the water tank; and
a water tank hinge provided between the water tank cover and the water tank and configured to rotate the water tank cover and thereby open the water tank.

13. The beverage maker according to claim 12, wherein the hinge, the fermentation module hinge, and the water tank hinge are parallel to each other.

14. The beverage maker according to claim 12, wherein the lock comprises a button that protrudes from a top surface of the lid and is configured to be pushed, a fermentation module cover lock that locks the fermentation module cover to the fermentation tank is provided on a top surface of the fermentation module cover, and a water tank cover lock that locks the water tank cover to the water tank is provided on a top surface of the water tank cover.

15. A beverage maker comprising:
a fermentation tank having an inner space;
a water tank in fluid communication with the fermentation tank; and
an ingredient supply assembly provided between the fermentation tank and the water tank and configured to hold at least one beverage ingredient, wherein the ingredient supply assembly comprises:
a first surface that faces the fermentation tank;
a second surface that faces the water tank;
an ingredient accommodation body between the first surface and the second surface;
at least one ingredient pocket recessed into the ingredient accommodation body and configured to receive the at least one beverage ingredient;
a lid configured to open and close the at least one ingredient pocket; and
a lock configured to lock the lid to the ingredient accommodation body when the lid is closed.

16. The beverage maker according to claim 15, wherein the ingredient supply assembly further comprises
a hinge shaft provided on one of the lid and the ingredient accommodation body.

17. The beverage maker according to claim 16, wherein the at least one ingredient pocket is provided between the hinge shaft and the lock.

18. The beverage maker according to claim 17, wherein the at least one ingredient pocket comprises a plurality of ingredient pockets, and the plurality of ingredient pockets are arranged in a line in a first direction perpendicular to a second direction in which the water tank and the fermentation tank are spaced apart from each other.

19. The beverage maker according to claim 17, further comprising a dispenser configured to dispense a beverage stored in the fermentation tank and provided on a first surface of the ingredient accommodation body, wherein a lever is provided on the dispenser and is configured to be manipulated by a user to dispense the beverage.

* * * * *